US007177980B2

(12) United States Patent
Milillo et al.

(10) Patent No.: US 7,177,980 B2
(45) Date of Patent: Feb. 13, 2007

(54) CACHE STORAGE SYSTEM AND METHOD

(75) Inventors: Michael S. Milillo, Louisville, CO (US); David G. Hostetter, Superior, CO (US); Christopher J. West, Boulder, CO (US); Robert P. Eskenberry, Broomfield, CO (US)

(73) Assignee: Storage Technology Corporation, Louisville, CO (US)

( * ) Notice: Subject to any disclaimer, the term of this patent is extended or adjusted under 35 U.S.C. 154(b) by 779 days.

(21) Appl. No.: 10/023,321

(22) Filed: Dec. 18, 2001

(65) Prior Publication Data

US 2003/0115408 A1 Jun. 19, 2003

(51) Int. Cl.
*G06F 12/00* (2006.01)
*G06F 9/26* (2006.01)

(52) U.S. Cl. ...................................... 711/113; 711/210

(58) Field of Classification Search ................ 711/113, 711/210

See application file for complete search history.

(56) References Cited

U.S. PATENT DOCUMENTS 5,379,391 A 1/1995 Belsan et al.
6,038,639 A 3/2000 O'Brien et al.

FOREIGN PATENT DOCUMENTS

EP 0 441 508 A2 8/1991

*Primary Examiner*—Mano Padmanabhan
*Assistant Examiner*—Mardochee Chery
(74) *Attorney, Agent, or Firm*—Brooks Kushman P.C.

(57) ABSTRACT

A cache storage system and method are provided for saving storage space in a cache, the system and method for use in a data storage system having multiple storage devices and multiple virtual addresses, each virtual address having a data object associated therewith. Each data object is stored at a storage device location having a unique identifier. The cache storage system and method include a cache for storing a data object associated with at least one virtual address. For a first virtual address, the first virtual address data object is staged into the cache. For a second virtual address, a pointer is generated for use in pointing to the first virtual address data object staged in the cache when the storage device location identifier of the second virtual address data object matches the storage device location identifier of the first virtual address data object.

18 Claims, 5 Drawing Sheets

CACHE STORAGE SYSTEM AND METHOD

BACKGROUND OF THE INVENTION

1. Field of the Invention

The present invention relates to a cache storage system and method.

2. Background

For improved data storage and management, a disk subsystem may present multiple virtual storage devices or volumes to a user, while employing multiple physical disk storage devices or volumes for actual storage of the user's data. In that regard, for a given virtual device configured on a disk subsystem, a single virtual track is identified by (i.e., named) a Virtual Track Address (VTA) and has a physical location where the data for the track is stored on the back-end at a physical disk storage device.

The efficiency of such subsystems has been improved using a unique copying mechanism, which may be referred to as "snapshot" copying. Snapshot copying is described in detail in U.S. Pat. No. 6,038,639 entitled "Data File Storage Management System For Snapshot Copy Operations," which is assigned to the assignee of the present application and which is hereby incorporated by reference. Implemented in a disk subsystem, rather than creating an additional copy of the data itself, the snapshot mechanism provides for copying only the pointers associated with the data. Thus, there are multiple names in the virtual world for the same physical data object.

For example, suppose Virtual Track Address (VTA) "X" maps to a data object stored on back-end devices at location "A." Further suppose that Virtual Track Address "Y" maps to a data object stored on back-end devices at location "B." A snapshot operation performed from VTA "X" to VTA "Y" creates the ability to access the data object stored at location A by either name "X" or name "Y." Such dynamic mapping of where data objects are found may be implemented through the use of a Log Structured File System, or other known dynamic mapping mechanisms. As a result, there are two tracks in the virtual world but only a single copy of the data in the physical world. It is the virtualization of storage that makes the snapshot copying feature possible in disk subsystems. The snapshot feature allows the same physical track to be accessed from multiple virtual track locations. One of the benefits of this form of replication is that the multiple copies of a virtual track do not require any additional physical space for the copies. In other words, one track is the same as a million tracks when it comes to space consumption of physical storage.

This benefit in space consumption, however, only applies to the space on the physical disk drives that make up the disk subsystem's physical storage. A limitation exists with the snapshot feature when a million "snapshot" tracks (i.e., one million copies of the same track) are read into the cache memory of the disk subsystem.

In that regard, the management of track images in cache memory systems is significantly different from the management of disk memory subsystems. More particularly, cache memory subsystems are divided into units, which may be referred to as segments, that are allocated to store the contents of a track when staged into the cache. Since there is no performance penalty for accessing different locations in cache memory as there is for storing tracks at different locations on a disk, a track will occupy whatever segments are available. Typically, a discontiguous set of cache segments holds the track contents. There is a structure, such as a directory, that identifies or lists the set of cache segments used for storing a particular track.

However, in the cache memory, each track occupies its own space and the amount of cache needed to hold one million copies of the same track is one million times the size of the original track. As a result, there exists a need for a cache storage system and method that provides a space consumption benefit in the cache memory of a storage system, such as a disk subsystem, similar to the benefit provided by snapshot copying in the physical disk storage devices of a disk subsystem. That is, there exists a need for cache storage system and method that allows cache segments holding track contents to be shared when the tracks are copies of each other.

SUMMARY OF THE INVENTION

Accordingly, it is an object of the present invention to provide an improved cache storage system and method.

According to the present invention, then, a cache storage system is provided for use in a data storage system having a plurality of virtual addresses, each virtual address having a data object associated therewith. The cache storage system comprises a plurality of storage devices, each data object being stored at a storage device location, each storage device location having a unique identifier. The cache storage system further comprises a cache for storing a data object associated with at least one virtual address. For a first virtual address, the first virtual address data object is staged into the cache. For a second virtual address, a pointer is generated for use in pointing to the first virtual address data object staged in the cache when the storage device location identifier of the second virtual address data object matches the storage device location identifier of the first virtual address data object.

Still further according to the present invention, a cache storage method is provided for use in a data storage system having a plurality of virtual addresses, each virtual address having a data object associated therewith. The cache storage method comprises providing a plurality of storage devices, each data object being stored at a storage device location, each storage device location having a unique identifier, and providing a cache for storing a data object associated with at least one virtual address. For a first virtual address, the first virtual address data object is staged into the cache. For a second virtual address, a pointer is generated for use in pointing to the first virtual address data object staged in the cache when the storage device location identifier of the second virtual address data object matches the storage device location identifier of the first virtual address data object.

According to another embodiment of the present invention, a cache storage system is provided for use in a data storage system, the data storage system comprising a plurality of storage devices and having a plurality of virtual addresses, each virtual address associated with a data object, each data object stored at a storage device location, each storage device location having a unique identifier. The cache storage system comprises a cache for storing a data object associated with at least one virtual address, a virtual address table for storing a plurality of virtual addresses, and a location identifier table for storing at least one storage device location identifier. For a first virtual address, the first virtual address data object is staged into the cache, the location identifier for the first virtual address data object is stored in the location identifier table, and the first virtual address is stored in the virtual address table and linked to the location identifier for the first virtual address data object stored in the location identifier table. For a second virtual address, a pointer is generated for use in pointing to the first virtual address data object staged in the cache when the location identifier of the second virtual address data object matches the location identifier stored in the location identifier table of the first virtual address data object, and the second virtual address is stored in the virtual address table and linked to the first virtual address.

Still further according to another embodiment of the present invention, a cache storage method is provided for use in a data storage system, the data storage system comprising a plurality of storage devices and having a plurality of virtual addresses, each virtual address associated with a data object, each data object stored at a storage device location, each storage device location having a unique identifier. The cache storage method comprises providing a cache for storing a data object associated with at least one virtual address, providing a virtual address table for storing a plurality of virtual addresses, and providing a location identifier table for storing at least one storage device location identifier. For a first virtual address, the first virtual address data object is staged into the cache, the location identifier for the first virtual address data object is stored in the location identifier table, and the first virtual address is stored in the virtual address table and linked to the location identifier for the first virtual address data object stored in the location identifier table. For a second virtual address, a pointer is generated for use in pointing to the first virtual address data object staged in the cache when the location identifier of the second virtual address data object matches the location identifier stored in the location identifier table of the first virtual address data object, and the second virtual address is stored in the virtual address table and linked to the first virtual address.

These and other features and advantages of the present invention are readily apparent from the following detailed description of the present invention when taken in connection with the accompanying drawings.

DETAILED DESCRIPTION OF THE PREFERRED EMBODIMENT(S)

Referring now to the Figures, the preferred embodiment of the present invention will now be described in detail. As previously noted, for improved data storage and management, a disk subsystem may present multiple virtual storage devices or volumes to a user, while employing multiple physical disk storage devices or volumes for actual storage of the user's data. In that regard, for a given virtual device configured on a disk subsystem, a single virtual track is identified by (i.e., named) a Virtual Track Address (VTA) and has a physical location where the data for the track is stored on the back-end at a physical disk storage device.

The efficiency of such subsystems has been improved using a unique copying mechanism, which may be referred to as "snapshot" copying. Snapshot copying is described in detail in U.S. Pat. No. 6,038,639 entitled "Data File Storage Management System For Snapshot Copy Operations," which is assigned to the assignee of the present application and which is hereby incorporated by reference. Implemented in a disk subsystem, rather than creating an additional copy of the data itself, the snapshot mechanism provides for copying only the pointers associated with the data. Thus, there are multiple names in the virtual world for the same physical data object.

For example, suppose Virtual Track Address (VTA) "X" maps to a data object stored on back-end devices at location "A." Further suppose that Virtual Track Address "Y" maps to a data object stored on back-end devices at location "B." A snapshot operation performed from VTA "X" to VTA "Y" creates the ability to access the data object stored at location A by either name "X" or name "Y." Such dynamic mapping of where data objects are found may be implemented through the use of a Log Structured File System, or other known dynamic mapping mechanisms. As a result, there are two tracks in the virtual world but only a single copy of the data in the physical world. It is the virtualization of storage that makes the snapshot copying feature possible in disk subsystems. The snapshot feature allows the same physical track to be accessed from multiple virtual track locations. One of the benefits of this form of replication is that the multiple copies of a virtual track do not require any additional physical space for the copies. In other words, one track is the same as a million tracks when it comes to space consumption of physical storage.

Figure 1:
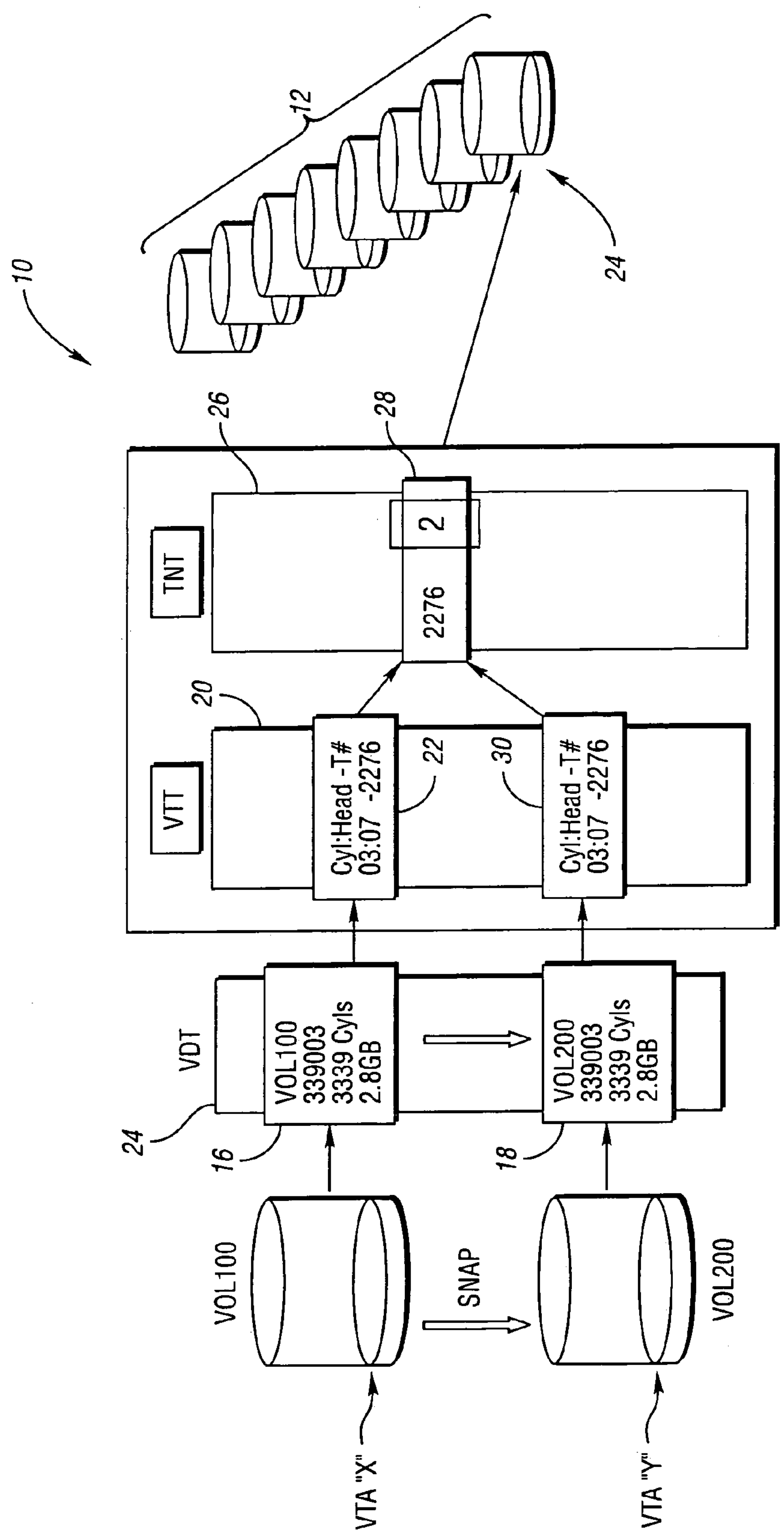
FIG. 1 is a simplified block diagram depicting a snapshot copy operation in a disk subsystem.

Such a snapshot copy operation in a disk subsystem is depicted in the simplified block diagram of FIG. 1. As seen therein, the disk subsystem is denoted generally by reference numeral 10, and includes a plurality of physical disk storage devices (12). A Virtual Disk Table (VDT) (14) includes an entry (16), namely VOL 100, 339003, 3339 Cyls, 2.8 GB, for a first virtual volume 100 configured with a predetermined size, and an entry (18), namely VOL 200, 339003, 3339 Cyls, 2.8 GB, for an identically sized second virtual volume 200. VTA "X," in this case Cylinder 03, Head 07, is stored in a Virtual Track Table (VTT) (20) in an entry (22), linked with or mapped to the unique Track Number (TN), in this case T#2276, identifying the physical location (24) where a data object (not shown) associated with VTA "X" is stored in the plurality of disk storage devices (12). A Track Number Table (TNT) (26) stores that TN in an entry (28).

In a snapshot operation to copy the data object (not shown) associated with VTA "X" in virtual volume 100 to VTA "Y" in virtual volume 200, the track number from entry (22) in VTT (20) for VTA "X" is replicated in the entry (30) in VTT (20) associated with VTA "Y." Entry (30) in VTT (20) is then linked with or mapped to entry (28) in TNT (26) storing the TN, here T#2276, identifying the physical location (20) where the data object (not shown) now associated with both VTA "X" in virtual volume 100 and VTA "Y" in virtual volume 200 is stored in the plurality of disk storage devices (12).

As a result, there are two tracks in the virtual world but only a single copy of the data in the physical world. It is the virtualization of storage that makes the snapshot copying feature possible. The snapshot feature allows the same physical track to be accessed from multiple virtual track locations. One of the benefits of this form of replication is that the multiple copies of a virtual track do not require any additional physical space for the copies. In other words, one track is the same as a million tracks when it comes to space consumption of physical storage.

As also previously described, however, this benefit in space consumption only applies to the space on the physical disk drives that make up the disk subsystem's physical storage. A limitation exists with the snapshot feature when a million "snapshot" tracks (i.e., one million copies of the same track) are read into the cache memory of the disk subsystem.

In that regard, the management of track images in cache memory systems is significantly different from the management of disk memory subsystems. More particularly, cache memory subsystems are divided into units, which may be referred to as segments, that are allocated to store the contents of a track when staged into the cache. Since there is no performance penalty for accessing different locations in cache memory as there is for storing tracks at different locations on a disk, a track will occupy whatever segments are available. Typically, a discontiguous set of cache segments holds the track contents. There is a structure, such as a directory, that identifies or lists the set of cache segments used for storing a particular track.

Figure 2:
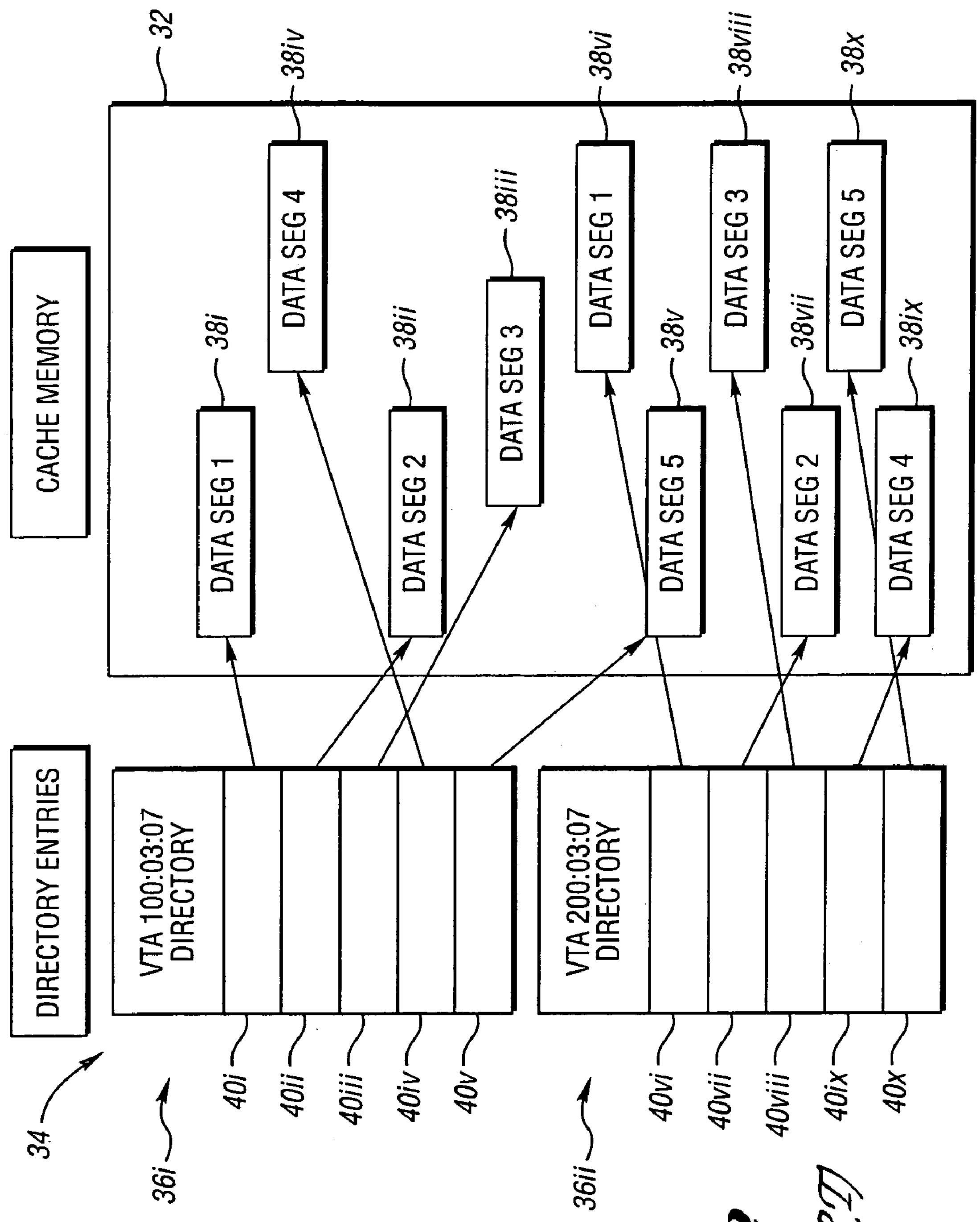
FIG. 2 is a simplified block diagram depicting operation of cache storage according to the prior art.

Referring now to FIG. 2, a simplified block diagram depicting operation of such prior art cache storage is shown. As seen therein, a cache memory is denoted generally by reference numeral 32. A directory (34), which may also be referred to as a cache directory, includes multiple entries (36*i*, 36*ii*), each of which describes the content of a virtual track, in this case VTA 100:03:01 and VTA 200:03:07, respectively, while the virtual track is in cache (32). The data for the tracks is stored in cache (32) in data segments (38*i*–38*x*) that are chunks of cache space used for cache allocation. Data segment addresses (40*i*–40*x*) in the directory entries (36*i*, 36*ii*) hold the location of the data segments (38*i*–38*x*) in the cache (32). Directory entries (36*i*, 36*ii*) also include record descriptors (not shown) which describe the location and length of each record on this track.

As can be seen from FIG. 2, however, even though tracks may be copies of each other, the data segments (38*i*–38*x*) for each track are staged in cache (32). That is, even though data segments 1–5 (38*i*–38*v*) of VTA 100:03:07 are the same content as data segments 1–5 (38*vi*–38*x*) of VTA 200:03:07, each one of those data segments 1–5 are staged (38*i*–38*x*) in cache (32) for both tracks. Thus, in the cache memory (32), each track occupies its own space, and the amount of cache needed to hold one million copies of the same track is one million times the size of the original track. As a result, there exists a need for a cache storage system and method that provides a space consumption benefit in the cache memory of a storage system, such as a disk subsystem, similar to the benefit provided by snapshot copying in the physical storage devices of a disk subsystem. That is, there exists a need for a cache storage system and method that allows cache segments holding track contents to be shared when the tracks are copies of each other.

The present invention provides a cache storage system and method that allows the sharing of common (i.e., snapshot) track images in cache just as the snapshot mechanism allows the physical sharing of common track images on the physical back-end disk drives. The cache storage system and method of the present invention allows the same user track data to be accessed by multiple virtual addresses when the data objects associated with those virtual addresses are in cache. Thus, a given cache size can hold many more data objects than previously possible.

In that regard, as described above in connection with FIG. 1, a location identifier, such as the Track Number (TN) in an disk subsystem, uniquely identifies the physical location of a data object in the disk storage devices. The Track Number (TN) can be used to identify copies of the same track. That is, again in a disk subsystem, all virtual tracks that are copies will have different Virtual Track Addresses (VTA's) but the same Track Number (TN). The Track Number is the "link" between the Virtual Track Address name and the physical disk storage device location of the data object for that name.

Figure 3:
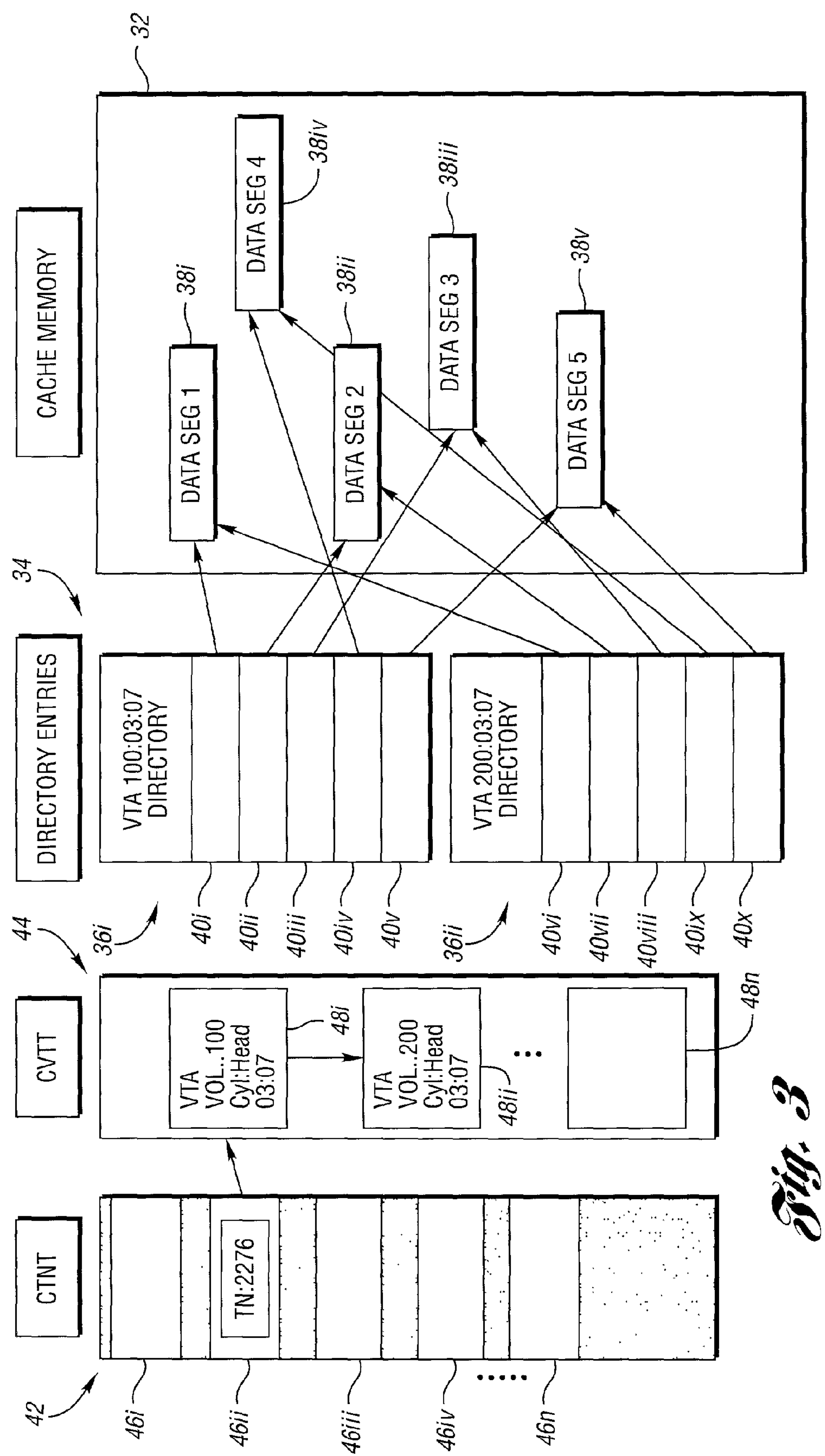
FIG. 3 is a simplified block diagram depicting operation of the cache storage system and method of the present invention.

Referring now to FIG. 3, a simplified block diagram depicting operation of the cache storage system and method of the present invention is shown. In a disk subsystem, the cache storage system and method of the present invention are preferably implemented using two tables. These are the Cache Track Number Table (CTNT) (42) and the Cache Virtual Track Table (CVTT) (44). In that regard, it should be noted that FIG. 3 depicts many of the same elements depicted in FIG. 2, which elements are denoted in FIG. 3 with like reference numerals.

The CTNT (42) identifies those virtual track addresses that have the same track number for each track in cache (32). The CTNT (42) has enough entries (46*i*, 46*ii*, 46*iii*, 46*iv*, . . . 46*n*) for every possible track in cache (32) since every track in cache (32) may have a unique track number when there are no snapshot copy tracks in the cache (32). The CVTT (44) holds each Virtual Track Address (VTA) of every virtual track address in cache (32). The CVTT (44) also has enough entries (48*i*, 48*ii*, . . . 48*n*) for every possible track in cache (32) since every virtual track will be identified with one CTNT entry (48*i*, 48*ii*, . . . 48*n*). As seen in FIG. 3, the VTA's that have the same track number are linked together. The VTA's of the CVTT (44) may all be linked together if every track in the cache (32) has the same track number (i.e., are all copies of a single track) or may not be linked to any other VTA if every track in cache (32) is not a copy of another track in cache (32). The CVTT (44) allows the subsystem to identify which virtual tracks share the same cache content.

In addition to the CTNT (42) and the CVTT (44), the cache storage system and method of the present invention build upon the structures used to implement the management of virtual tracks in the cache (32). In that regard, a directory (34), which again may also be referred to as a cache directory, includes multiple entries (36*i*, 36*ii*), each of which describes the content of a virtual track while the virtual track is in cache (32). As an example, the directory entry may support the Count-Key-Data (CKD) format supported by IBM mainframe computers. The count field information of each record on the track is stored directly in the directory entry (36*i*, 36*ii*). The key and data fields are stored in the cache (32). It should be noted, however, that the cache storage system and method may be implemented to support any other format known in the art.

The data in cache (32) is stored in data segments (38*i*–38*v*) that are 8-kilobyte chunks of cache space used for cache allocation, although any other size may be used. Again in the example of the CKD format, each record's count field and the location of its key and data fields in cache (32) are held in data segment addresses (40*i*–40*x*) in the directory entry (36*i,* 36*ii*). According to the cache storage system and method of the present invention, however, when tracks are copies of each other, a directory entry (36*i,* 36*ii*) is created for a copy of a virtual track that has the same set of data segments 1–5 (38*i*–38*v*) and the same record descriptor content as the other tracks and therefore shares key and data fields. The cache directory entry (36*i,* 36*ii*) thus acts as a type of pointer for use in pointing to a track already in the cache (32) and shared by multiple virtual addresses. It should be noted here that, according to the cache storage system and method of the present invention, in the CKD format described above, the count fields located in the record descriptor of each track are preferably not shared. The reason is that in IBM mainframes running the MVS operating system, the cylinder and head information of the track is buried in the count field of each record on the track. Since the cylinder and head of copied tracks will be different for each track, these count fields are kept separate and unique even for copied tracks.

Figure 4:
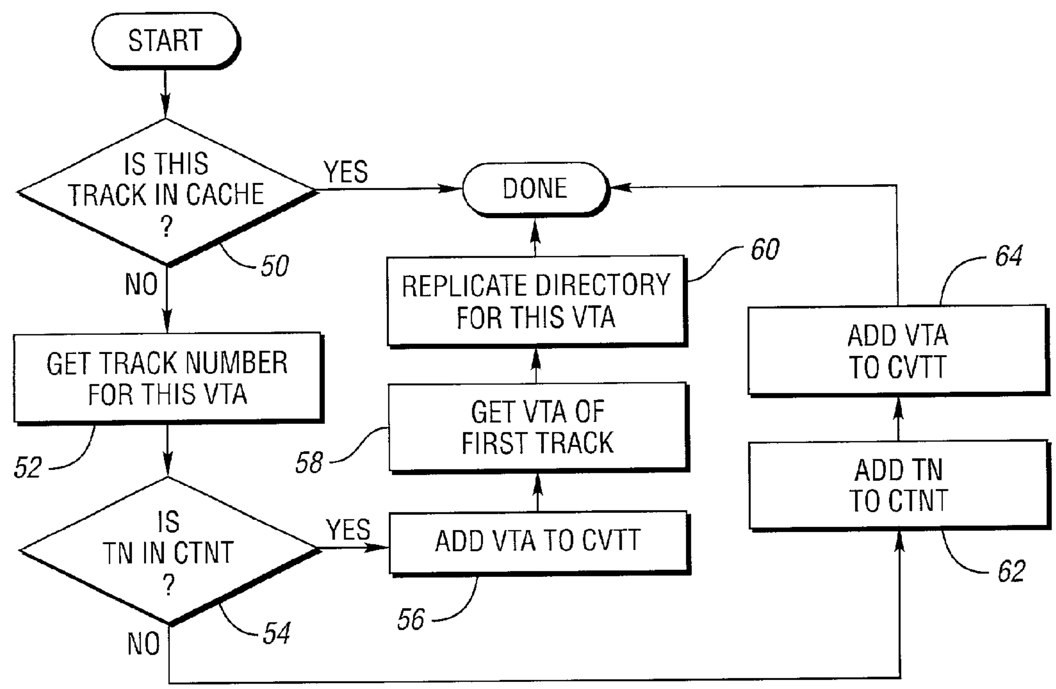
FIG. 4 is a flowchart of a cache miss operation according to the cache storage system and method of the present invention.

The process of making virtual copies of tracks in cache (32) begins with a cache miss operation for a specific virtual track. In that regard, FIG. 4 is a flowchart of a cache miss operation according to the cache storage system and method of the present invention. As seen therein, and with continuing reference to FIGS. 1 and 3, when there is a cache miss for a virtual track (50), the Track Number of the virtual track is requested (52) from the Virtual Track Table (20). The Cache Track Number Table (CTNT) (42) is then searched (54) to determine if a snapped version (i.e., a copy) of the track is already in cache (32). If so (i.e., if there is a virtual track in cache (32) with the same track number as this track), then the VTA is added (56) to the CVTT (44) for this TN. This track's cache directory uses the same cache data segment space as the other tracks. In that regard, the directory entry of the virtual track that is first on the list is used (58) to duplicate (60) the directory of this virtual track. If the virtual track's track number is not found in the CTNT (42), then this track's track number is added (62) to the CTNT (42) and the VTA is added (64) to the CVTT (44) when the data object or content of this track is placed (i.e., staged or stored) in cache (32).

Figure 5:
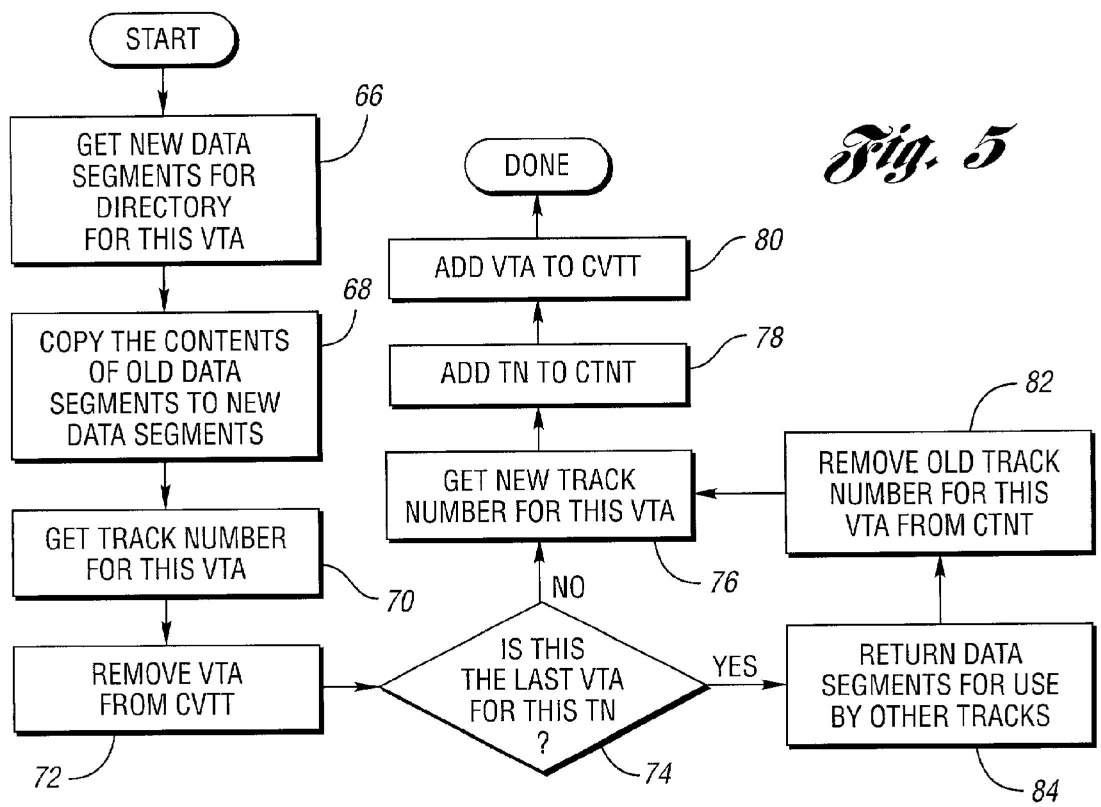
FIG. 5 is a flowchart of a track modified operation according to the cache storage system and method of the present invention.

Referring next to FIG. 5, a flowchart of a track modified operation according to the cache storage system and method of the present invention is shown. As seen therein, and again with continuing reference to FIGS. 1 and 3, whenever a virtual track is modified, a new set of cache segments is requested (66), the contents of the track's data segments are copied (68) to that new set of cache data segments, the track number (TN) for that Virtual Track Address (VTA) is obtained (70), and that VTA is removed (72) from the Cache Virtual Track Table (CVTT) (44) list for that TN. If that TN has additional VTA's (74), then a new TN is obtained (76) for that VTA, the new TN is added (78) to the CTNT (42), and that VTA is added (80) to the CVTT (44). When the last VTA has been removed due to a write command or a discard operation (74), then the CTNT entry (38*i,* 38*ii,* 38*iii,* 38*iv,* . . . 38*n*) for that TN is made empty (82) and the cache data segments for that TN can be freed for storing other tracks (84).

The CTNT (42) and CVTT (44) tables are a database of names. The names in the CTNT (42) are Track Numbers (TNs). The names in the CVTT (44) are Virtual Track Addresses (VTAs). The sizes of these tables vary with the size of the cache (32). With a 32 GB cache, for example, the number of tracks in cache (32) is 2,097,152 entries. In this case, 8-megabytes are preferably provided for the CTNT (42) and preferably 16-megabytes are provided for the CVTT (44) due to link field overhead. Due to the size of these tables, both tables are preferably stored in cache (32) with "cached" entries in shared memory to allow a performance improvement to access the most recently used entries. However, the CTNT (42) and CVTT (44) may alternatively be stored elsewhere, such as in an appropriately sized processor memory (not shown).

The lookup and storing of names involves the classic trade-off of time versus space. A hash lookup is used to find and store the TN in the CTNT (42). The CVTT entries (40*i,* 40*ii,* . . . 40*n*) are linked together for a common TN. The VTA is placed into the CVTT (44) in the same relative order as the directory entry that holds the track. The address of the VTA entry in the CVTT (44) is needed to delete the entry and to select a VTA to "copy."

Thus, as described above, the cache storage system of the present invention is for use in a data storage system having a plurality of virtual addresses, each virtual address having a data object associated therewith. The cache storage system comprises a plurality of storage devices, each data object being stored at a storage device location, each storage device location having a unique identifier, and a cache for storing a data object associated with at least one virtual address. For a first virtual address, the first virtual address data object is copied into the cache. For a second virtual address, a pointer is generated for use in pointing to the first virtual address data object stored in the cache when the storage device location identifier of the second virtual address data object matches the storage device location identifier of the first virtual address data object.

As also described above, the cache may comprise a location identifier table for storing at least one storage device location identifier, as well as a virtual address table for storing a plurality of virtual addresses. The data storage system may comprise a disk subsystem, where the plurality of storage devices comprise a plurality of disk storage devices, each virtual address comprises a virtual track address, each storage device location identifier comprises a track number, the virtual address table comprises a virtual track number table, and the location identifier table comprises a track number table. Still further, the cache storage system may also comprise a cache directory, wherein the pointer comprises an entry in the cache directory, the cache directory entry comprising a location in the cache of a segment storing data associated with a data object shared by the first and second virtual addresses.

Alternatively, as previously described, the cache storage system of the present invention is for use in a data storage system, the data storage system comprising a plurality of storage devices and having a plurality of virtual addresses, each virtual address associated with a data object, each data object stored at a storage device location, each storage device location having a unique identifier. In this embodiment, the cache storage system comprises a cache for storing a data object associated with at least one virtual address, a virtual address table for storing a plurality of virtual addresses, and a location identifier table for storing at least one storage device location identifier. For a first virtual address, the first virtual address data object is copied into the cache, the location identifier for the first virtual address data object is stored in the location identifier table, and the first virtual address is stored in the virtual address table and linked to the location identifier for the first virtual address data object stored in the location identifier table. For a second virtual address, a pointer is generated for use in pointing to the first virtual address data object stored in the cache when the location identifier of the second virtual address data object matches the location identifier stored in the location identifier table of the first virtual address data object, and the second virtual address is stored in the virtual address table and linked to the first virtual address.

As also previously described, in this embodiment, either or both of the virtual address and location identifier tables may be stored in the cache. The data storage system may comprise a disk subsystem, where the plurality of storage devices comprises a plurality of disk storage devices, each virtual address comprises a virtual track address, each storage device location identifier comprises a track number, the virtual address table comprises a virtual track number table, and the location identifier table comprises a track number table. As also described previously, the cache storage system may further comprise a cache directory, wherein the pointer comprises an entry in the cache directory, the cache directory entry comprising a location in the cache of a segment storing data associated with a data object shared by the first and second virtual addresses.

Figure 6:
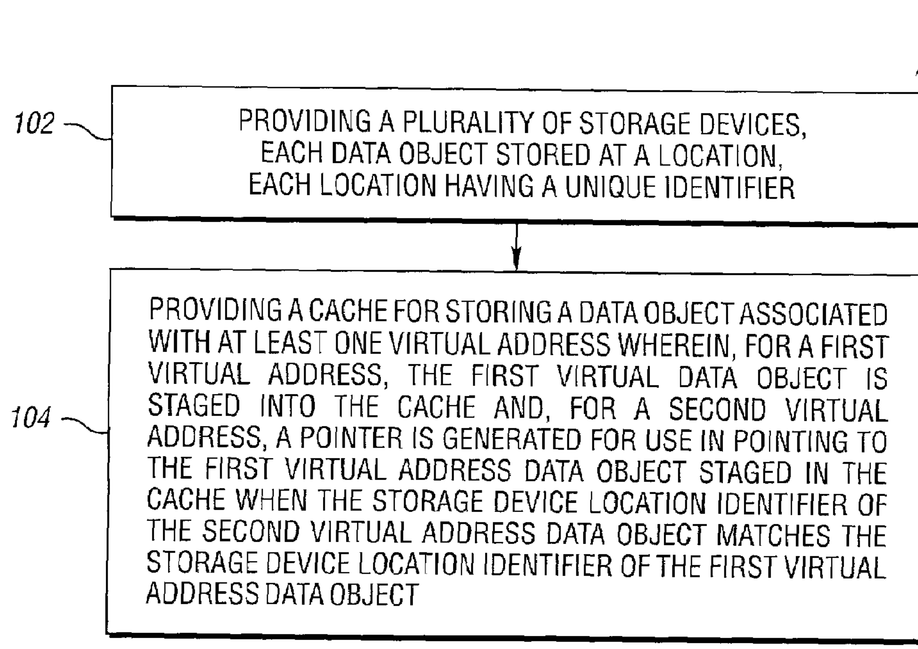
FIG. 6 is a simplified, representative flowchart depicting one embodiment of the cache storage method of the present invention.

Referring next to FIG. 6, a simplified, representative flowchart depicting one embodiment of the cache storage method of the present invention is shown, denoted generally by reference numeral 100. The method (100) is for use in a data storage system having a plurality of virtual addresses, each virtual address having a data object associated therewith. As seen in FIG. 6, the method (100) comprises providing (102) a plurality of storage devices, each data object being stored at a storage device location, each storage device location having a unique identifier, and providing (104) a cache for storing a data object associated with at least one virtual address. According to the method (100), for a first virtual address, the first virtual address data object is copied into the cache. For a second virtual address, a pointer is generated for use in pointing to the first virtual address data object stored in the cache when the storage device location identifier of the second virtual address data object matches the storage device location identifier of the first virtual address data object.

As previously described, the cache may comprise a location identifier table for storing at least one storage device location identifier, as well as a virtual address table for storing a plurality of virtual addresses. The data storage system may comprise a disk subsystem. In that case, the plurality of storage devices comprise a plurality of disk storage devices, each virtual address comprises a virtual track address, each storage device location identifier comprises a track number, the virtual address table comprises a virtual track number table, and the location identifier table comprises a track number table. Still further, as also previously described, the pointer may comprise an entry in a cache directory, the cache directory entry comprising a location in the cache of a segment storing data associated with a data object shared by the first and second virtual addresses.

Figure 7:
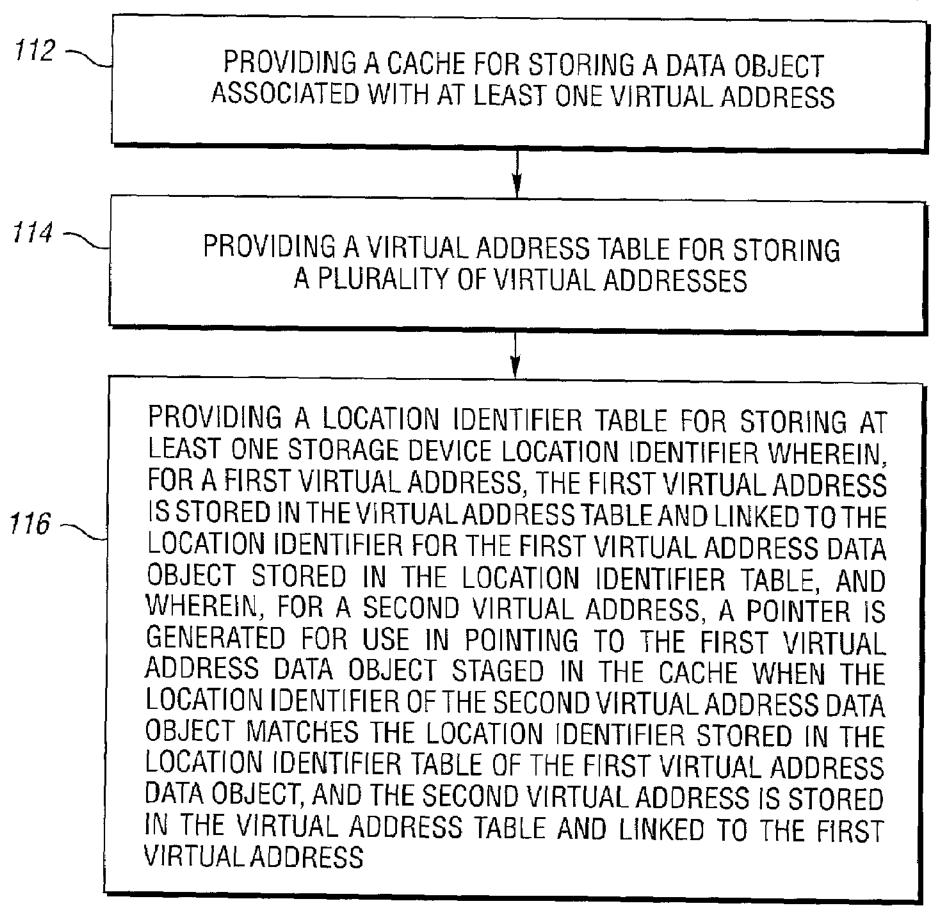
FIG. 7 is a simplified, representative flowchart depicting another embodiment of the cache storage method of the present invention.

Referring finally to FIG. 7, a simplified, representative flowchart depicting another embodiment of the cache storage method of the present invention is shown, denoted generally by reference numeral (110). The method (110) is for use in a data storage system, the data storage system comprising a plurality of storage devices and having a plurality of virtual addresses, each virtual address associated with a data object, each data object stored at a storage device location, each storage device location having a unique identifier. The method (110) comprises providing (112) a cache for storing a data object associated with at least one virtual address, providing (114) a virtual address table for storing a plurality of virtual addresses, and providing (116) a location identifier table for storing at least one storage device location identifier. According to the method (110), for a first virtual address, the first virtual address data object is copied into the cache, the location identifier for the first virtual address data object is stored in the location identifier table, and the first virtual address is stored in the virtual address table and linked to the location identifier for the first virtual address data object stored in the location identifier table. For a second virtual address, a pointer is generated for use in pointing to the first virtual address data object stored in the cache when the location identifier of the second virtual address data object matches the location identifier stored in the location identifier table of the first virtual address data object, and the second virtual address is stored in the virtual address table and linked to the first virtual address.

Once again, as described above, in this embodiment, either or both of the location identifier and virtual address tables may be stored in the cache. The data storage system may comprise a disk subsystem. In that case, the plurality of storage devices comprise a plurality of disk storage devices, each virtual address comprises a virtual track address, each storage device location identifier comprises a track number, the virtual address table comprises a virtual track number table, and the location identifier table comprises a track number table. Still further, as also described previously, the pointer may comprise an entry in a cache directory, the cache directory entry comprising a location in the cache of a segment storing data associated with a data object shared by the first and second virtual addresses.

It should be noted that the simplified flowcharts depicted in FIGS. 6 and 7 are exemplary of the cache storage method of the present invention. In that regard, the steps of such method may be executed in sequences other than those shown in FIGS. 6 and 7, including the execution of one or more steps simultaneously.

As is readily apparent from the foregoing description, the present invention provides a cache storage system and method that allow cache segments holding track contents to be shared when the tracks are copies of each other. The cache storage system and method of the present invention thus expand to cache memory the benefits of efficient disk storage of replicated tracks. The cache storage system and method of the present invention permits more tracks to be fit into cache, thereby increasing the cache-hit rate and the performance of reads and writes over a cache-miss condition. The cache storage system and method of the present invention thus allows operations that had not previously been available, such as multiple clients replicating the data contents of disks and sharing of data while tracks are in cache.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A cache storage system for use in a data storage system having a plurality of virtual addresses, each virtual address having a data object associated therewith, the cache storage system comprising:

a plurality of storage devices, each data object being stored at a storage device location, each storage device location having a unique identifier; and a cache for storing a data object associated with at least one virtual address wherein, for a first virtual address, the first virtual address data object is staged into the cache and, for a second virtual address, a pointer is generated for use in pointing to the first virtual address data object staged in the cache when the storage device location identifier of the second virtual address data object matches the storage device location identifier of the first virtual address data object, and wherein the cache comprises a location identifier table for storing at least one storage device location identifier, and a virtual address table for storing a plurality of virtual addresses.

2. The system of claim 1 wherein the data storage system comprises a disk subsystem, the plurality of storage devices comprise a plurality of disk storage devices, each virtual address comprises a virtual track address, and each storage device location identifier comprises a track number.

3. The system of claim 1 wherein the pointer comprises an entry in a cache directory, the cache directory entry comprising a location in the cache of a segment storing data associated with a data object shared by the first and second virtual addresses.

4. A cache storage method for use in a data storage system comprising a plurality of storage devices and having a plurality of virtual addresses, each virtual address having a data object associated therewith, the method comprising:

storing each data object at a storage device location, each storage device location having a unique identifier; and storing in a cache a data object associated with at least one virtual address wherein, for a first virtual address, the first virtual address data object is staged into the cache and, for a second virtual address, a pointer is generated for use in pointing to the first virtual address data object staged in the cache when the storage device location identifier of the second virtual address data object matches the storage device location identifier of the first virtual address data object, and wherein the cache comprises a location identifier table for storing at least one storage device location identifier, and a virtual address table for storing a plurality of virtual addresses.

5. The method of claim 4 wherein the data storage system comprises a disk subsystem, the plurality of storage devices comprise a plurality of disk storage devices, each virtual address comprises a virtual track address, and each storage device location identifier comprises a track number.

6. The method of claim 4 wherein the pointer comprises an entry in a cache directory, the cache directory entry comprising a location in the cache of a segment storing data associated with a data object shared by the first and second virtual addresses.

7. A cache storage system for use in a data storage system, the data storage system comprising a plurality of storage devices and having a plurality of virtual addresses, each virtual address associated with a data object, each data object stored at a storage device location, each storage device location having a unique identifier, the cache storage system comprising:

a cache for storing a data object associated with at least one virtual address;

a virtual address table for storing a plurality of virtual addresses; and a location identifier table for storing at least one storage device location identifier;

wherein, for a first virtual address, the first virtual address data object is staged into the cache, the location identifier for the first virtual address data object is stored in the location identifier table, and the first virtual address is stored in the virtual address table and linked to the location identifier for the first virtual address data object stored in the location identifier table, and wherein, for a second virtual address, a pointer is generated for use in pointing to the first virtual address data object staged in the cache when the location identifier of the second virtual address data object matches the location identifier stored in the location identifier table of the first virtual address data object, and the second virtual address is stored in the virtual address table and linked to the first virtual address.

8. The system of claim 7 wherein the virtual address table is stored in the cache.

9. The system of claim 7 wherein the location identifier table is stored in the cache.

10. The system of claim 7 wherein the virtual address and location identifier tables are stored in the cache.

11. The system of claim 7 wherein the data storage system comprises a disk subsystem, the plurality of storage devices comprises a plurality of disk storage devices, each virtual address comprises a virtual track address, each storage device location identifier comprises a track number, the virtual address table comprises a virtual track number table, and the location identifier table comprises a track number table.

12. The system of claim 7 wherein the pointer comprises an entry in a cache directory, the cache directory entry comprising a location in the cache of a segment storing data associated with a data object shared by the first and second virtual addresses.

13. A cache storage method for use in a data storage system, the data storage system comprising a plurality of storage devices and having a plurality of virtual addresses, each virtual address associated with a data object, each data object stored at a storage device location, each storage device location having a unique identifier, the method comprising:

storing in a cache a data object associated with at least one virtual address;

storing in a virtual address table a plurality of virtual addresses; and storing in a location identifier table at least one storage device location identifier;

wherein, for a first virtual address, the first virtual address data object is staged into the cache, the location identifier for the first virtual address data object is stored in the location identifier table, and the first virtual address is stored in the virtual address table and linked to the location identifier for the first virtual address data object stored in the location identifier table, and wherein, for a second virtual address, a pointer is generated for use in pointing to the first virtual address data object staged in the cache when the location identifier of the second virtual address data object matches the location identifier stored in the location identifier table of the first virtual address data object, and the second virtual address is stored in the virtual address table and linked to the first virtual address.

14. The method of claim 13 wherein the virtual address table is stored in the cache.

15. The method of claim 13 wherein the location identifier table is stored in the cache.

16. The method of claim 13 wherein the virtual address and location identifier tables are stored in the cache.

17. The method of claim 13 wherein the data storage system comprises a disk subsystem, the plurality of storage devices comprise a plurality of disk storage devices, each virtual address comprises a virtual track address, each storage device location identifier comprises a track number, the virtual address table comprises a virtual track number table, and the location identifier table comprises a track number table.

18. The method of claim 13 wherein the pointer comprises an entry in a cache directory, the cache directory entry comprising a location in the cache of a segment storing data associated with a data object shared by the first and second virtual addresses.

* * * * *